United States Patent [19]

Nagai

[11] Patent Number: 5,115,379
[45] Date of Patent: May 19, 1992

[54] COMPOSITE FILTER AND ILLUMINATING DEVICE

[76] Inventor: Kiyoshi Nagai, 228-91, Sachigawa, Oomiyashi Saitama, Japan

[21] Appl. No.: 635,795

[22] Filed: Dec. 31, 1990

Related U.S. Application Data

[63] Continuation of Ser. No. 287,589, Dec. 4, 1988, abandoned, which is a continuation of Ser. No. 92,683, Sep. 3, 1987, abandoned, which is a continuation-in-part of Ser. No. 900,542, Aug. 26, 1986, abandoned.

[30] Foreign Application Priority Data

Aug. 27, 1985 [JP] Japan ................ 60-130728

[51] Int. Cl.⁵ ........................... G01D 11/28
[52] U.S. Cl. ........................... 362/23; 362/293; 362/30; 359/350; 359/890
[58] Field of Search ........ 362/23, 26, 28, 29, 362/30, 293; 350/1.6, 1.1, 311, 316; 359/885, 890, 350, 359

[56] References Cited

U.S. PATENT DOCUMENTS

| | | | |
|---|---|---|---|
| 2,062,179 | 11/1936 | Hunter | 350/1.1 |
| 2,479,501 | 8/1949 | Marks | 350/1.1 |
| 2,816,047 | 12/1957 | Mahler | 350/1.1 |
| 2,831,282 | 4/1958 | Harderty | 362/31 |
| 2,931,117 | 4/1960 | Bosworth et al. | 362/29 |
| 2,999,148 | 9/1961 | Kay | 362/30 |
| 3,059,051 | 10/1962 | Jacobi et al. | 350/311 |
| 3,146,120 | 8/1964 | Upton et al. | 350/1.1 |
| 3,193,509 | 7/1965 | Hoffman et al. | 350/1.1 |
| 3,241,256 | 3/1966 | Viret et al. | 362/30 |
| 3,382,183 | 5/1968 | Donoian et al. | 350/1.1 |
| 3,826,751 | 7/1974 | Laliberte | 350/1.1 |
| 4,321,655 | 3/1982 | Bourrande | 362/29 |
| 4,453,200 | 6/1984 | Ticka et al. | 362/30 |
| 4,535,396 | 8/1985 | Guthrie | 362/29 |
| 4,616,902 | 10/1986 | Nagai | 350/316 |

FOREIGN PATENT DOCUMENTS

| | | | |
|---|---|---|---|
| 490719 | 2/1954 | Italy | 362/30 |
| 0135809 | 10/1981 | Japan | 350/311 |
| 60-17702 | 1/1985 | Japan . | |
| 60-16101 | 2/1985 | Japan . | |
| 60-16180 | 2/1985 | Japan . | |
| 566114 | 12/1944 | United Kingdom | 362/30 |

OTHER PUBLICATIONS

"Schott Optical Color Filter Glass", Schott Optical Glass, Inc. Oct. 1970, 35 pages.
"Infrared transmission of several Non-Silicate Glass Systems", The Glass Industry, by Lin, Francis Li; vol. 44, No. 2 pp. 87-91 Feb. 1963.

*Primary Examiner*—Ira S. Lazarus
*Assistant Examiner*—D. M. Cox
*Attorney, Agent, or Firm*—Frishauf, Holtz, Goodman & Woodward

[57] ABSTRACT

A composite filter advantageously employable for dark field observation systems which comprises a dyed organic resin layer provided on a dyed glass plate. The organic resin layer and the glass plate in combination absorb light of a radiation spectrum in the region of longer than 600 nm under the condition that the transmission of light at 650 nm is defined to a level of $1 \times 10^{-4}\%$ to 5% and the transmission of light at 800 nm is defined to a level of lower than $2 \times 10^{-5}\%$. Another dyed glass plate which shows an absorption spectrum having absorption peaks in regions of 480-535 nm and 560-600 nm may be incorporated into the composite filter. The composite filter can be introduced into or provided to an illuminating device.

6 Claims, 5 Drawing Sheets

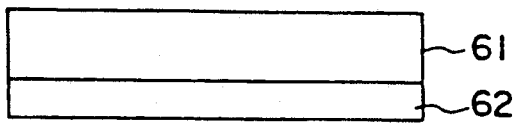
FIG. 6
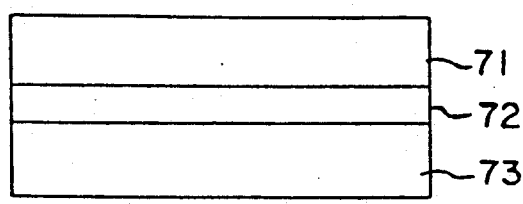
FIG. 7
FIG. 8a (PRIOR ART)
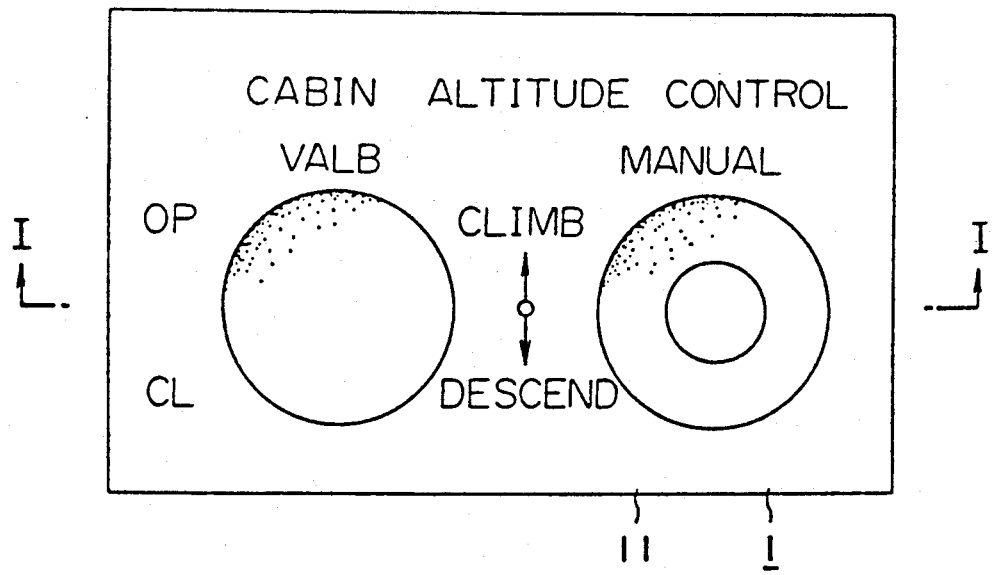
FIG. 8b (PRIOR ART)
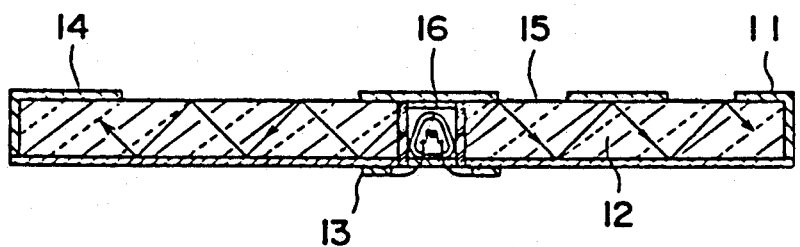

COMPOSITE FILTER AND ILLUMINATING DEVICE

This application is a continuation of application Ser. No. 07/287,589, filed Dec. 4, 1988, which in turn is a continuation of Ser. No. 07/092,683 filed Sep. 3, 1987, which in turn is a continuation-in-part of Ser. No. 06/900,542 filed Aug. 26, 1986, all now abandoned.

BACKGROUND OF THE INVENTION

1. Field of the Invention

This invention relates to a composite filter advantageously employable in dark field observation systems and further relates to an illuminating device provided with the composite filter.

2. Description of Prior Art

A technology of detecting an image in dark field such as at dark night with no moonlight has been recently developed. This detecting technology utilizes starlight as light source and its detection system contains a multichanneled plate and a photoelectric conversion element matching with the starlight.

It is known that the earth goes through a space in which approx. a hundred thousand stars are dispersed, for one day. Most of the stars emit light. Among them, ultraviolet (UV) rays emitted by new-born stars (age: 100,000-1,000,000 years old) are scattered or absorbed by an atmospheric gas, etc. so that most of the UV rays hardly reach the surface of the earth. On the contrary, the near infrared(IR) rays emitted by stars of approx. $5 \times 10^6$ years old reach the surface of the earth. The spectrum of light emitted by the stars and received by the earth is shown in FIG. 1 as curve (i). Accordingly, photoelectric conversion elements employed in the detection system in dark field observation have photoelectric conversion characteristics as shown in FIG. 1 as curve (ii). This means that a light having a radiation spectrum in the region of 600 to 800 nm (or up to 900 nm) is multiplied by the photoelectric conversion element.

The observation system utilizing the starlight has been developed and now employed generally in the military and police works, because such observation system advantageously does not need employment or artificial light.

Since the observation system now utilizes a multichanneled secondary electron multiplier, the gain is made at very high level. It is known that the detection device employed for the dark field observation system contains a number of artificial light sources such as a lighting device, various illuminating display devices, etc., most of which emit light having a radiation spectrum overlapping in part with the radiation spectrum of starlight. Particularly, the radiation spectrum of a red lamp (which is generally employed as a light source) well overlaps with the radiation spectrum of moonlight. Generally, the luminance of light emitted by these artificial light sources is several millions times to several ten millions times as high as that of the starlight. Therefore, if any light of the artificial light source is incidentally received in the visual field of the observer, not only such light causes noise but also the highly amplified artificial light causes burning and further destroys retinas of the observer's eyes.

For obviating such troubles, the present inventor invented a composite filter for intercepting light of a radiation spectrum in the region of 600-900 nm comprising at least one organic film filter and at least one glass filter, in which the organic film filter absorbs light of a radiation spectrum in the region of 600-700 nm and the glass filter absorbs light of a radiation spectrum in the region of 700-900 nm. This invention is described in U.S. Pat. No. 4,616,902.

SUMMARY OF THE INVENTION

The present inventor has further studied to improve the above-mentioned composite filter which is more advantageously employable in dark field observation system and noted that the composite filter is preferably provided with a function to allow transmission of small amount of yellow light, for the following reason. In certain dark field observation systems, a warning light such as yellow light or orange light is employed in combination with the illuminating red light to warn the observer in the case of emergency. In such systems, the observer should be noted immediately when the emergency arises. Accordingly, the filter is advantageous to allow transmission of a small quantity of light of a yellow region or an orange region.

Accordingly, it is an object of the present invention to provide a composite filter advantageously employable for dark field observation system.

It is another object of the invention to provide an improvement of the composite filter for intercepting light of a radiation spectrum in the region of 600-900 nm which comprises at least one organic film filter and at least one glass filter, in which the organic film filter absorbs light of a radiation spectrum in the region of 600-700 nm and the glass filter absorbs light of a radiation spectrum in the region of 700-900 nm, which is described in U.S. Pat. No. 4,616,902.

It is a further object of the invention to provide a composite filter which is advantageously employable not only for dark field observation system but also for viewing a color CRT display.

There is provided by the present invention a composite filter comprising a dyed organic resin layer provided on a dyed glass plate in which the resin layer and the glass plate in combination absorb light of a radiation spectrum in the region of longer than 600 nm under the condition that the transmission of light at 650 nm is defined to a level in the range of $1 \times 10^{-4}$ to 5%, preferably $1 \times 10^{-3}$ to 5%, and the transmission of light at 800 nm (generally at least up to 1,000 nm) is defined to a level of lower than $2 \times 10^{-5}$%.

The present invention further provides a composite filter which comprises a first dyed glass plate, a dyed organic resin layer and a second dyed glass plate, in which the resin layer and the first glass plate in combination absorb light of a radiation spectrum in the region of longer than 600 nm under the condition that the transmission of light at 650 nm is defined to a level in the range of $1 \times 10^{-4}$ to 5%, preferably $1 \times 10^{-3}$ to 5%, and the transmission of light at 800 nm is defined to a level of lower than $2 \times 10^{-5}$%, and the second dyed glass plate shows an absorption spectrum having absorption peaks in regions of 480-535 nm and 560-600 nm.

BRIEF DESCRIPTION OF DRAWINGS

FIG. 6 shows a schematic view showing a constitution of a composite filter of the invention.

FIG. 7 shows a schematic view showing another constitution of a composite filter of the invention.

FIG. 8a is a perspective view of a known illuminating display device and FIG. 8b is a section view taken along the line I—I in FIG. 8a.

DETAILED DESCRIPTION OF THE INVENTION

Figure 1:
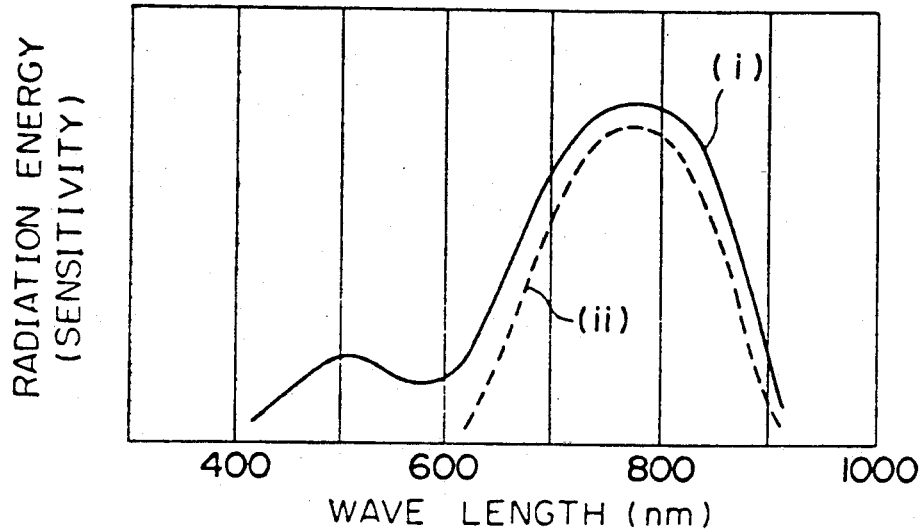
FIG. 1 shows spectra in which (i) is a radiation spectrum of light emitted by the stars and received by the earth, and (ii) is a representative photoelectric conversion spectrum of a light conversion element used in the conventional night-observation system.
Figure 2:
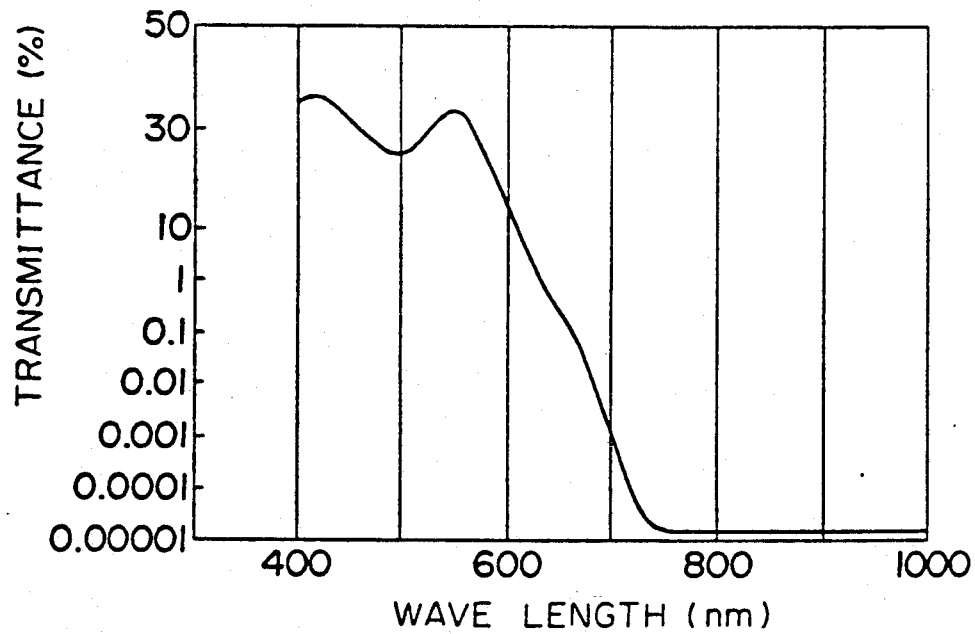
FIG. 2 shows a typical absorption spectrum of a composite filter of the present invention.

One embodiment of the composite filter of the invention favorably employable in dark field observation system typically has a constitution illustrated in FIG. 6 and shows an absorption spectrum given in FIG. 2.

Figure 3:
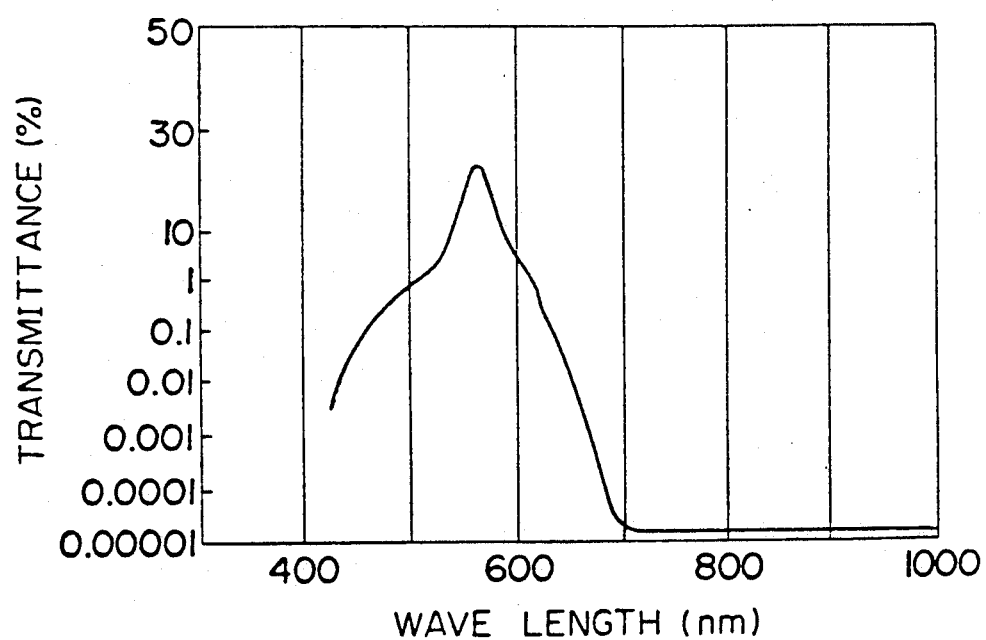
FIG. 3 shows another typical absorption spectrum of a composite filter of the present invention.

In more detail, the composite filter of FIG. 6 comprises a dyed glass plate 61 and a dyed organic resin layer 62 provided on the dyed glass plate 61. The dyed glass plate 61 and the dyed resin layer 62 in combination absorb a light of a radiation spectrum in the region of longer than 600 nm under the condition that the transmission of light at 650 nm is defined to a level in the range of $1 \times 10^{-4}$ to 5% and the transmission at 800 nm is defined to a level of lower than $2 \times 10^{-5}$%. Another example of the absorption spectrum of the above composite filter is shown in FIG. 3.

The glass plate preferably absorbs light of a radiation spectrum in the region of 700-900 nm, and can be a glass plate colored with a cobalt-containing salt or other coloring material having an absorption spectrum in the region of 700-900 nm. The glass plate generally is phosphate glass. The coloring material can be employed singly or in combination, the latter being adaptable for adjusting the absorption spectrum to a more appropriate region. The glass plate generally has a thickness in the range of 0.1-10 mm, more preferably in the range of 0.5-5 mm. Such glass filter can be prepared in a conventional manner.

The organic resin layer preferably absorbs most of light of a radiation spectrum in the region of 650-700 nm but allows a small quantity of the light in the region so as to transmit a warning light having a radiation spectrum in the region. The organic resin layer can be prepared, for instance, from an organic polymer such as polycarbonate resin, polyacryl resin, polyester resin, cellulose derivative (e.g., cellulose diacetate, cellulose triacetate, etc.) dyed with an appropriate dye having the above-mentioned spectrum. Examples of the appropriate dye include a combination of a red dye (e.g., Irgalan Red 2GL 200, tradename, available from Chiba-Geigy, or NP Red KN, tradename, available from Toya Dye Co., Ltd., Japan) and a yellow dye (e.g., Tron Brilliant Golden Yellow RR, tradename, available from Toya Dye Co., Ltd., Japan). Each of the red dye and yellow dye can be used singly or in combination. The organic resin layer generally has a thickness in the range of 0.01-2 mm.

Figure 4:
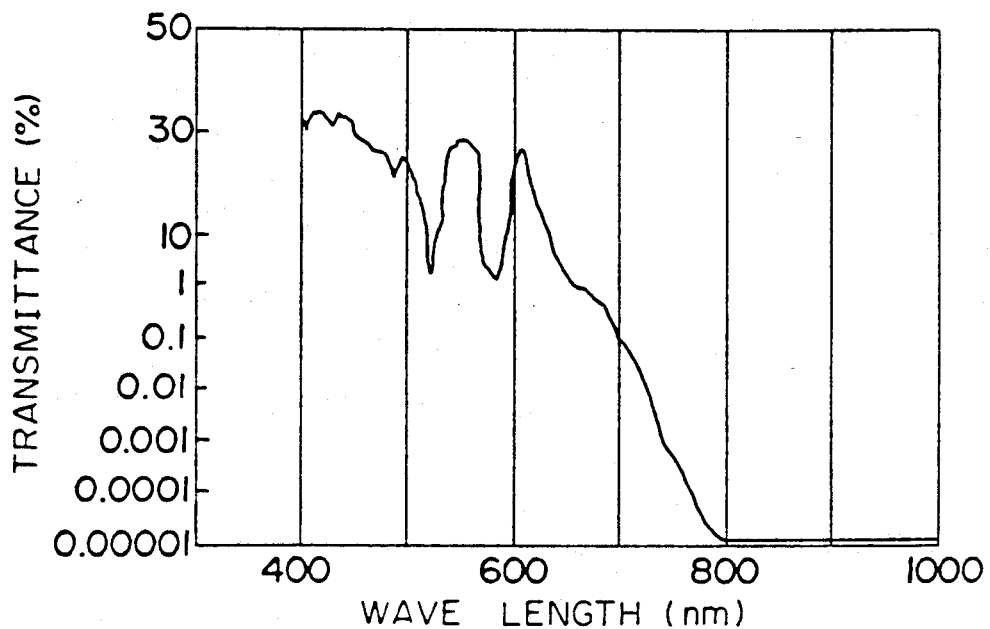
FIG. 4 shows a typical absorption spectrum of a modified composite filter of the invention.

Another embodiment of the composite filter of the invention also favorably employable in dark field observation system typically has a constitution illustrated in FIG. 7 and shows an absorption spectrum given in FIG. 4.

In more detail, the composite filter of FIG. 7 comprises a first dyed glass plate 71, a dyed organic resin layer 72 and a second dyed glass plate 73. The resin layer 72 and the first glass plate 71 in combination absorb a light of a radiation spectrum in the region of longer than 600 nm under the condition that the transmission of light at 650 nm is defined to a level in the range of $1 \times 10^{-4}$ to 5% and the transmission of light at 800 nm is defined to a level of lower than $2 \times 10^{-5}$%. The second glass plate 73 shows an absorption spectrum having absorption peaks in regions of 480-535 nm and 560-600 nm.

The first dyed glass plate 71 and the dyed organic resin 72 are essentially the same as the dyed glass plate 61 and the dyed organic resin layer 62, respectively, described with respect to FIG. 6.

Figure 5:
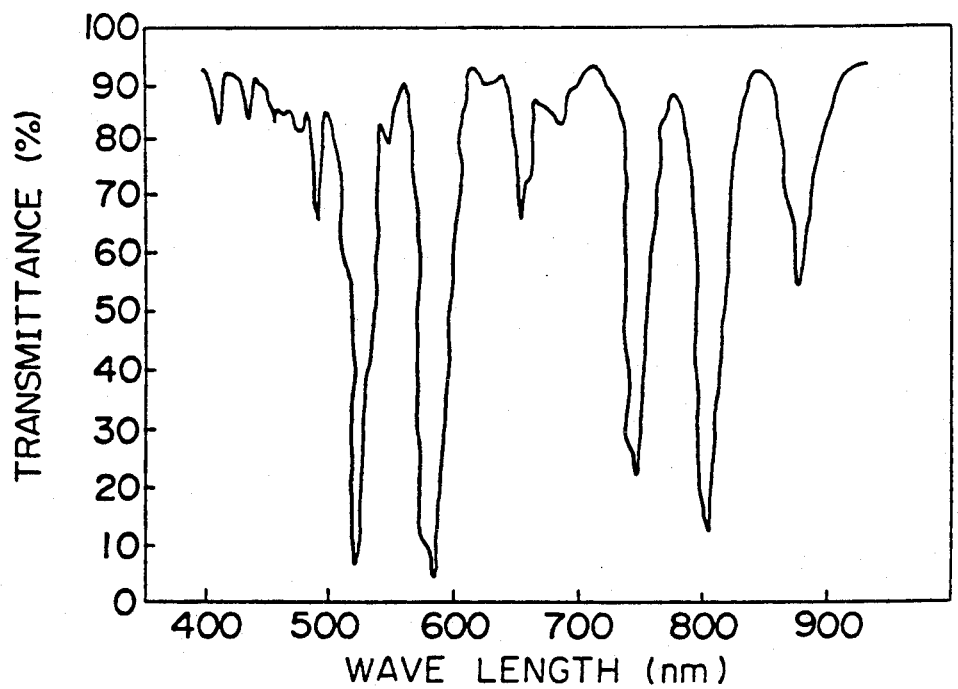
FIG. 5 shows a typical absorption spectrum of a dyed glass plate which can be incorporated into the composite filter of FIG. 2.

The second dyed glass plate typically has an absorption spectrum with absorption peaks in regions of 480-535 nm and 560-600 nm, as shown in FIG. 5. This second dyed glass plate serves to allow luminescence (phosphorescence) of red, green and blue colors having radiated from phosphors used in the conventional color display devices and effectively intercept transmission of other light. Accordingly, the incorporation of the second dyed glass plate into the combination of the first dyed glass plate and the dyed organic layer is effective for viewing a color image of a display device with improved high contrast. A dyed glass plate of this type as such is known. Such dyed glass is described, for instance, in Japanese Patent Publication 61(1986)-58410. A glass plate preferably employable in the present invention for the purpose comprises a base glass composition such as 63.5-74.4 wt. % of $P_2O_5$, 1.6-9.2 wt. % of $B_2O_3$, 2.9-6.5 wt. % of $Al_2O_3$, 7.4-10.0 wt. % of MgO, 6.4-7.4 wt. % of CaO, and 2.0-2.2 wt. % of FeO, and a coloring composition suc as 3-8 wt. % of $Nd_2O_3$, 4-8 wt. % of $Er_2O_3$, 0.3-0.8 wt. % of $Cr_2O_3$ and a small amount of $Ho_2O_3$.

The composite filter can be employed alone or in combination with other devices such as a telescope, binoculars, an illuminating device, and a color display device in dark field observation systems.

As one emobodiment, the composite filter can be provided to a known illuminating device illustrated in FIGS. 8a and 8b.

There is known an illuminating display device of light-directing type. A representative structure of the known illuminating display device is schematically illustrated in FIGS. 8a and 8b, in which FIG. 8a is a perspective view of the device and FIG. 8b is a section view taken along the line I—I in FIG. 8a. In the figures, a display panel 1 gives an illuminating image or pattern which can be seen from the outside. The light for providing such illumination is supplied through a transparent organic resin plate 12 from an incandescent lamp 16 embedded around the center of the resin plate 12. The resin plate 12 is provided under the display panel 1. The electric power for the lamp can be supplied from an electroconductive layer 13 provided on the back surface of the resin plate 12. The electric power can be supplied in other ways. The display panel is made of a light-reflective sheet and has one or more of patterned window portions for allowing transmission of the light supplied from the resin plate. There can be provided a white powder such as glass powder on the resin plate and in the window area of the display panel so as to diffuse the transmitted light for giving uniform illumination.

Upon receipt of electric power, the incandescent lamp 16 emits a light which then diffuses in the resin plate 12 under multiple reflection in the manner as shown in FIG. 8b indicated by arrows. Therefore, it can be said that the resin plate 12 as such functions as a light source under the condition that the lamp 16 constantly and stably supplies a light to the resin plate 12.

Figure 9:
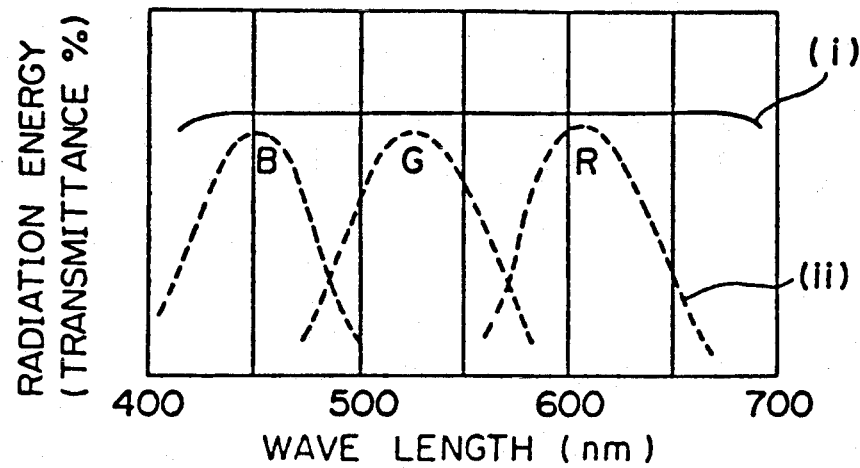
FIG. 9 shows spectra in which (i) is a radiation spectrum of a light emitted by a incandescent lamp and (ii)-B, (ii)-G and (ii)-R are transmission spectra of blue filter, green filter and red filter, respectively.

The incandescent lamp emits a light of a radiation spectrum in a wide range from a low wavelength region to a long wavelength region as is shown by (i) in FIG. 9. Therefore, the color of illumination can be easily varied by placing a filter or filters of blue, green and/or red over or around the lamp.

Figure 10:
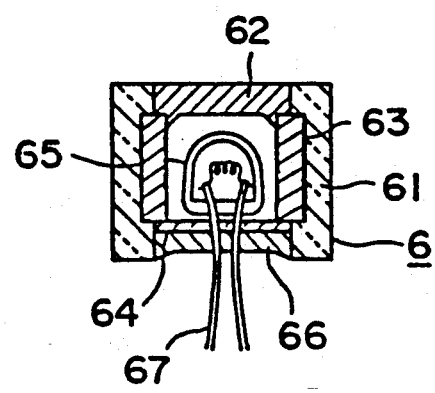
FIG. 10 shows a representative embodiment of the illuminating device according to the invention.

FIG. 10 shows a representative embodiment of the illuminating device of the invention.

In FIG. 10, the illuminating device 6 comprises an incandescent lamp 65 and a transparent casing 61 which encases the lamp 65. Over the lamp 65 is provided a reflective plate 62 to keep the light emitted from the lamp 65 from transmission therethrough. The reflective plate can be made of aluminum metal or other material with a plated reflective metal layer. The wall portion of the casing 61 surrounding the side portion of the lamp 65 is provided with as a composite filter 63 as described hereinbefore. The lamp 65 is fixed on a substrate 64, and the lamp 65 and the substrate 64 are sealed by a sealing means 66 such as an nonconductive resin. The lamp 65 is connected to a power source (not illustrated) via lead lines 67.

What is claimed is:

1. A composite filter comprising a dyed organic resin layer provided on a dyed glass plate, wherein the resin layer and the glass plate in combination absorb light of a radiation spectrum in the region of longer than 600 nm under the condition that the transmission of orange-red light at 650 nm is defined to a level in the range of $1 \times 10^{-3}$ to 5% and the transmission of light at 800 nm is defined to a level of lower than $2 \times 10^{-5}$%.

2. The composite filter as claimed in claim 1, wherein the glass plate is colored with a cobalt-containing compound.

3. A composite filter comprising a first dyed glass plate, a dyed organic resin layer and a second dyed glass plate, wherein the resin layer and the first glass plate in combination absorb light of a radiation spectrum in the region of longer than 600 nm under the condition that the transmission of orange-red light at 650 nm is defined to a level in the range of $1 \times 10^{-3}$ to 5% and the transmission of light at 800 nm is defined to a level of lower than $2 \times 10^{-5}$%, and the second dyed glass plate has an absorption spectrum having absorption peaks in regions of 480-535 nm and 560-600 nm.

4. The composite filter as claimed in claim 3, wherein the first glass plate is colored with a cobalt-containing compound.

5. The composite filter as claimed in claim 3, wherein the second glass plate is colored with a neodymium-containing compound.

6. In an illuminating device comprising an incandescent lamp and a transparent casing which encases said lamp, the improvement wherein a wall portion of said casing surrounding a side portion of the lamp is comprises a composite filter comprising a dyed organic resin layer provided on a dyed glass plate in which the resin layer and the glass plate in combination absorb light of a radiation spectrum in the region of longer than 600 nm under the condition that the transmission of light at 650 nm is defined to a level in the range of $1 \times 10^{-3}$ to 5% and the transmission of light at 800 nm is defined to a level of lower than $2 \times 10^{-5}$%.

* * * * *